(12) United States Patent
Elias

(10) Patent No.: US 10,704,923 B2
(45) Date of Patent: Jul. 7, 2020

(54) METHOD, METERING EQUIPMENT, USER DEVICE, AND SYSTEM FOR PROVIDING OF METERING INFORMATION

(75) Inventor: Holger Elias, Windach (DE)

(73) Assignee: Provenance Asset Group, Pittsford, NY (US)

( * ) Notice: Subject to any disclaimer, the term of this patent is extended or adjusted under 35 U.S.C. 154(b) by 871 days.

(21) Appl. No.: 14/350,649

(22) PCT Filed: Oct. 14, 2011

(86) PCT No.: PCT/EP2011/068002
§ 371 (c)(1),
(2), (4) Date: Apr. 9, 2014

(87) PCT Pub. No.: WO2013/053401
PCT Pub. Date: Apr. 18, 2013

(65) Prior Publication Data
US 2014/0253343 A1 Sep. 11, 2014

(51) Int. Cl.
*G01D 4/00* (2006.01)
(52) U.S. Cl.
CPC ............ *G01D 4/002* (2013.01); *Y02B 90/241* (2013.01); *Y04S 20/32* (2013.01)
(58) Field of Classification Search
None
See application file for complete search history.

(56) References Cited

U.S. PATENT DOCUMENTS

| 6,954,144 B1* | 10/2005 | Kiser | G01D 4/002 340/10.1 |
|---|---|---|---|
| 2005/0086341 A1 | 4/2005 | Enga et al. | |
| 2010/0238003 A1 | 9/2010 | Chan et al. | |
| 2010/0306533 A1* | 12/2010 | Phatak | G06F 21/34 713/156 |

(Continued)

FOREIGN PATENT DOCUMENTS

GB  2473083 A  3/2011

OTHER PUBLICATIONS

Engage Consulting Limited: "ENA Smart Metering System Requirements Update", , Apr. 1, 2010 (Apr. 1, 2010), XP002678214, Retrieved from the Internet: URL:http://www.energynetworks.org/electricity/futures/smart-meters.html [retrieved on Jun. 18, 2012].

(Continued)

*Primary Examiner* — Thomas S McCormack
(74) *Attorney, Agent, or Firm* — Dinsmore & Shohl LLP

(57) ABSTRACT

A method, metering equipment, a user device, and a system provide metering information. In particular, the method for providing metering information of the metering equipment, includes detecting a communication request input at the metering equipment, activating a communication interface of the metering equipment responsive to the detected communication request input, receiving instruction information via the activated communication interface, and providing via the activated communication interface the metering information responsive to the received instruction information. The communication interface is deactivated at the latest after a time period since the activating of the communication interface.

44 Claims, 4 Drawing Sheets

(56) References Cited

U.S. PATENT DOCUMENTS

| | | | |
|---|---|---|---|
| 2011/0029655 A1* | 2/2011 | Forbes, Jr. | G06Q 10/00 709/223 |
| 2011/0208371 A1* | 8/2011 | Duncan | G01D 4/002 700/297 |
| 2011/0254697 A1* | 10/2011 | Casey | G01D 4/002 340/870.02 |
| 2011/0271352 A1 | 11/2011 | Kalogridis et al. | |

OTHER PUBLICATIONS

Sahil Ganguly et al: "Efficient Encryption and Key Management in Advanced. Metering Infrastructure", May 6, 2011 (May 6, 2011), XP55028116, Retrieved from the Internet: URL:morse.colorado.edu/~tlen5710/11s/11AMI Keys.pdf [retrieved on May 24, 2012].

* cited by examiner

METHOD, METERING EQUIPMENT, USER DEVICE, AND SYSTEM FOR PROVIDING OF METERING INFORMATION

BACKGROUND OF THE INVENTION

Field of the Invention

The invention relates to a method, a metering equipment, a user device, and a system for providing of metering information.

Metering equipment, e.g., for electricity, gas, water, or other media consumption measurements, need to communicate measured consumption data to a metering server for charging and billing processing. By now consumers read out the measured consumption manually by themselves and report the measured consumption to their utility companies or responsible metering companies or authorized representatives of these companies having personal access to the location of the metering equipment do the reading out and reporting of the measured consumption. Modern metering equipment alternatively provides, even without having access to an electricity network, wide area communication interfaces as for instance WAN, 3GPP interfaces on base of a battery based power supply, thus allowing remotely controlled reading out of the metering data.

However, the readiness to be available for providing the metering data on demand exhausts the battery and makes frequent service activities for battery exchange necessary. Furthermore, many customers do not wish to provide a permanent or frequent readability of their consumption due to privacy reasons. Other customers want to have control on the time of the reading of the measured consumption and want to verify the correctness of the reading out. Some customers also fear the radiation generated by these meters, in particular, if these meters are closely located to or located in their living and/or sleeping rooms. Due to the complexity of the communication interfaces manufacturing and operation cost of the communication interfaces are comparably high in relation to the overall cost of the metering equipment.

It is therefore a need in the prior art to provide a method, equipment and system for providing of metering information that enable the reading of consumption measurements out of a metering equipment without the disadvantages of the prior art.

This need is accomplished by the method for providing of metering information, further by the metering equipment, the user device and the system for providing of metering information. Depending claims refer to specific embodiments of the present invention.

BRIEF SUMMARY OF THE INVENTION

According to an embodiment of the present invention there is provided a method for providing of metering information of a metering equipment, comprising detecting a communication request input at the metering equipment, activating a communication interface of the metering equipment responsive to the detected communication request input, receiving instruction information via the activated communication interface, providing via the activated communication interface the metering information responsive to the received instruction information, and deactivating the communication interface at the latest after a time period since the activating.

As the communication interface is activated in response to a communication request and deactivated at latest after the time period, the communication interface will only consume energy during the time of its activation, thus the energy consumption is advantageously limited by this time period. The time period may be defined as being sufficient to complete the receiving and providing under normal operation conditions, e.g., without presence of disturbances of transmission causing excessive number of repetitions for the receiving and/or the providing, which may be message based each. The time period may have a fixed length or may depend on the HW, FW, and/or SW version of the metering equipment. The time period may as well be configurable to allow for instance adaptation to performance and quality of communication via the communication interface.

According to another embodiment the received instruction information comprises key information; the method further comprises the step of verifying the key information responsive to the receiving, and the providing the metering information is responsive to the verified key information. Thus metering information is only provided in case of a successful verifying. This enables to respond to instruction information only in the case of a successful authentication on the basis of the key information. Only authenticated instruction information leads to the providing of the metering information. Thus the privacy and/or security of the metering information is ensured. A not authenticated instruction information does not lead to the providing of the metering information. Further by avoiding the providing an additional reduction of the energy consumption in the metering equipment is effected due to avoidance of unnecessary processing and transmission of the metering information.

Pursuant to another embodiment the key information comprises a token and/or the metering information comprises a reply token. Thus advantageously also the provided metering information may be authenticated by its receiver. This increases the security of the providing, e.g., by restricting the usability of the provided metering information to cases, in which the received provided metering information can be authenticated. Thus for instance the correctness of the origin of the provided metering information may be verified.

According to a further embodiment the received instruction information comprises encrypted instruction data, the method further comprises the step of decrypting the instruction data responsive to the receiving, and the providing the metering information is responsive to the decrypted instruction data.

Thus advantageously the instruction itself is protected against reading and interpretation of non-authorized parties. Non-allowed instructions, inserted by non-authorized parties, can be filtered out, i.e. do not result in a providing of the metering information. The decrypting of the encrypted instruction data allows further to transport sensitive data, e.g., tariff and/or configuration data of the metering equipment, which should not be visible to the public as part of the instruction data.

Pursuant to a further embodiment the decrypting is responsive to the verifying. Thus unnecessary processing in the metering equipment is advantageously avoided. This further reduces the energy consumption of the metering equipment.

According to another embodiment the communication interface comprises a short distance radio interface, in particular a low power local area network Bluetooth interface. Thus at the same time energy saving as well as increase of privacy is achieved. An access to the metering information from, e.g., outside the house of a customer or a building may be excluded by the short distance effect. Only equipment sufficiently close to the metering equipment is able to communicate with the metering equipment and to receive the provided metering information. However, to get close to the metering equipment for instance access to closed rooms. In which the metering equipment may be installed, e.g., in a building has to be achieved, what implies the overcoming of additional physical obstacles like locked doors etc. As well the energy needed for a short distance connection by the metering interface is reduced. Further the emitted radiation of the metering equipment is reduced, which may be unwished by sensitive users or customers. As alternative instead of a short distance radio interface an optical interface may be applied. Such optical interface may, e.g., be an infrared light based interface. The optical interface may provide the same or similar advantages as described above.

According to a further embodiment the communication request input is provided by a switch or a push button at the metering equipment. Consequently a person that has gained access to the location of the metering equipment is able to initiate the providing of the metering information by physical actuation at the metering equipment. As alternatives all manually operable switching devices, e.g., switches, keys, switchers, circuit breakers, contactors, interrupters or shifters may as well be appropriate devices instead of the switch or push button. Due to the electro-mechanical character of the communication request input, no or very little energy is needed to detect the communication request input, as required for a device, that in a standby mode waits for its activation via optical, electromagnetic, or network based activation. As well the communication request input may be provided by special equipment located closely to the metering equipment or connected to the metering equipment, e.g., clock timers or sensors being connected to or integrated into the metering equipment or effecting a mechanical switching of the switch or pushing the bush button.

According to another embodiment the method further comprises establishing a communication link via the activated communication interface. Thus a message based communication is enabled, further increasing security and privacy.

Pursuant to another embodiment the establishing further comprises sending a communication request via the communication interface, obtaining credentials via the communication interface in response to the sending, authenticating the obtained credentials. Thus advantageously the established link itself is authenticated. An unintended or not admissible link, e.g., a link to a device, which is not allowed to access the metering equipment, cannot be established and thus is not available for providing the metering information. This additionally increases security on base of a low communication layer, in particular a communication layer below the application layer.

According to another embodiment the obtained credentials comprise a PIN. Thus the user, e.g., the customer of the utility provider, may advantageously determine the security by selection of a sufficiently secure PIN code and its secure handling.

According to a further embodiment the receiving is responsive to the establishing. According to that only after establishing the communication link the metering equipment enters a status, in which it is ready to receive the instruction information. Consequently no or almost no energy for a readiness to receive the instruction information will be consumed before.

Pursuant to a further embodiment the time period is configurable. This advantageously effects, that the time period may be adapted to the needs of the Hardware, Firmware and/or Software of the metering equipment, e.g., in terms of processing capacity, communication performance, and/or memory consumption of the metering equipment, the protocols used for providing the metering information, the maximum number of retrials in case of unsuccessful receiving and/or unsuccessful providing.

Pursuant to a further embodiment the received instruction information comprises at least one of a read request for metering data stored in the metering equipment, a tariff information for storage in the metering equipment, an upgrade information for Firmware upgrade of the metering equipment. Thus the method is applicable for reading out metering data and/or all kinds of maintenance activities for the metering equipment, as for instance adaption of the functionality of the metering equipment with regard to tariff or other functionality, fault handling, and diagnosis for assurance of proper functionality, or checking of correct configuration and operation status.

According to another embodiment the metering information comprises execution information. Thus the metering information may comprise an execution information, e.g., for acknowledging storage of new or altered configuration parameters, for acknowledging activating a new or updated tariff option, a new metering schedule etc. Thus the metering information may not necessarily comprise any metering data. As well the metering information may comprise an execution information and metering data.

Pursuant to another embodiment the method further comprises the step of generating execution information responsive to the received instruction information. This provides the advantage to acknowledge the receiving of the instruction information.

According to a further embodiment the execution information comprises at least one of a metering data stored in the metering equipment, an execution acknowledgement, a fault data, a status data, a configuration data, a tampering information. The metering data may in particular be a measured consumption of energy, gas, electricity, cold water, warm water, or a heat consumption. As well the metering data may be a measured supply of energy, gas, electricity, cold water, warm water, or a heat supply.

Fault data may be related to any detected fault situation or implausibility, in particular battery exhaustion or voltage loss, loss of communication with dependent meters, for which the metering equipment provides metering data, lack of memory for storage of further metering data. Status data may reflect the operation status of the metering equipment, e.g., metering functionality according to a certain time schedule, as may be requested by a certain tariff, occupancy of memory, grade of allowed privacy of the metering data, log data of, e.g., updates and/or communication requests. Configuration data may for instance comprise the HW, SW and/or FW version of the metering equipment, the usage of the interfaces, the privacy level requested by the customer and/or user. The configuration data may as well comprise the length of the time period. Thus comprehensive support of all maintenance work at and related to the metering equipment can be achieved via the metering information provided.

The tampering information may comprise data stored by the metering equipment, in order to document and/or describe previous accesses to the metering equipment, that may be suspected to have been unauthorized or manipulative. In particular, the tampering information may comprise data describing previous accesses, for which the verifying has not been successful. The tampering information may comprise information related to type, time, and/or number of accesses suspected to have been unauthorized or manipulative. The tampering information advantageously may be provided via the providing the metering information and may inform the metering company and/or enable the metering company to take appropriate measures against future unauthorized access to and/or manipulation of the metering equipment.

Pursuant to another embodiment the method further comprises encrypting the execution information, wherein the metering information comprises the encrypted execution information. This advantageously enables the privacy of the metering information, when sent via the established link and/or when sent via the communication network.

According to a further embodiment the deactivating is responsive to the providing. Thus the communication interface can be deactivated, after the providing has been performed, without waiting till the time period is over. Thus the needed energy of the metering equipment is further reduced.

It is a further embodiment, that the method further comprises receiving in a user device from a metering server the instruction information via a communication network. Thus the metering server of a metering company or a utility company may provide the instruction information according to the needs of a version of the installed metering equipment at a customer's location. Further advantages are broad applicability due to usage of a user device and a communication network the user device is connected with.

According to another embodiment, the method further comprises displaying user information responsive to the receiving the instruction information. This provides the advantage, that the customer may receive information, in particular progress information on the process of providing the metering information and/or information on the completed and/or the next steps of providing the metering data. The user information may as well comprise a user instruction with respect to said next steps.

According to another embodiment, the method further comprises establishing by the user device a communication link between the user device and the metering equipment.

According to a further embodiment, the method further comprises providing by the user device via the established communication link the instruction information received in the user device.

According to another embodiment, the method further comprises receiving in the user device via the established communication link the metering information responsive to the providing the instruction information received in the user device.

According to yet another embodiment, the method further comprises sending by the user device the received metering information via the communication network.

Thus the advantages result, that the user device automatically establishes communication with the metering equipment, that the user device automatically provides the instruction information via the established link, that the user device automatically receives the metering information via the established link and/or that the user device automatically sends the received metering information via the communication network, e.g., to the metering server. Furthermore, the sending the received metering information may be responsive to the availability of communication to the metering server.

According to another embodiment for the receiving the instruction information in the user device and/or for the sending the received metering information by the user device there is used at least one of a 2G connection, a 3G connection, a 4G connection, a WAN connection, a WiFi connection, a WLAN connection, a DSL connection, a cable connection, a fiber optic based connection. Thus a user device adapted to support at least one of the cited connections may advantageously be used to provide the metering information.

Pursuant to another embodiment the method further comprises at least one of requesting from the metering server by the user device the instruction information via the communication network, storing locally the received instruction information, storing locally the received metering information, displaying further user information responsive to the receiving the metering information, resuming communication via the communication network, if said communication is interrupted. Thus the process of providing the metering information may be initiated by the user device, e.g., as consequence of appropriate user input at the user device. The local storage of instruction information and/or the metering information increases robustness of the providing the metering information in case of disturbances and/or non-accessibility of an established link or the communication network. As well further progress and status information can be provided to the customer, showing the details and/or the next steps of providing the metering data. The further user information may in particular comprise further user instructions. Furthermore, an automatically resuming of communication after temporary loss of communication is advantageously enabled.

According to another embodiment the method further comprises downloading from the metering server to the user device a software component for the providing of the metering information. This provides the advantage that the executable program for providing the metering data may be provided by the metering server. The software component may be provided in dependence on the HW and/or SW needs of the user device.

Pursuant to another embodiment the software component is executable in the user device. Thus the software component may comprise executable program for execution on the user device. As well or alternatively the software component may comprise executable program for execution in the metering equipment. The latter may be downloaded to the metering equipment by the user device as part of the instruction information.

According to yet another embodiment the software component is a Java applet embedded in a web page or is provided via HTML5. Thus application level functionality for download and program execution is advantageously usable in the user device.

According to another embodiment of the present invention a metering equipment for providing of metering information is provided, comprising detecting means for detecting a communication request input at the metering equipment, activating means for activating a communication interface of the metering equipment responsive to the detected communication request input, receiving means for receiving instruction information via the activated communication interface, providing means for providing via the activated communication interface the metering information responsive to the received instruction information, deactivating means for deactivating the communication interface at the latest after a time period since the activating.

According to another embodiment the received instruction information comprises key information, the metering equipment further comprises verifying means for verifying the key information responsive to the receiving, and the providing means is adapted to providing the metering information responsive to the verified key information.

According to another embodiment the received instruction information comprises instruction data, the metering equipment further comprises decrypting means for decrypting the received instruction data responsive to the receiving, and the providing means is adapted to providing the metering information responsive to the decrypted instruction data.

According to another embodiment the decrypting means is adapted to decrypting the instruction data responsive to the verifying the key information.

According to another embodiment the metering equipment further comprises input means, in particular a switch or a push button, for providing the communication request input.

According to another embodiment the metering equipment further comprises establishing means for establishing a communication link via the activated communication interface.

According to another embodiment the establishing means further comprises sending means for sending a communication request via the communication interface, obtaining means for obtaining credentials via the communication interface in response to the sending, and authenticating means for authenticating the obtained credentials.

According to another embodiment the receiving means is adapted to receive the instruction information responsive to the establishing the communication link.

According to another embodiment the metering equipment further comprises encrypting means for encrypting the execution information, wherein the metering information comprises the encrypted execution information.

According to another embodiment the deactivating means is adapted to deactivating the communication interface responsive to the providing the metering information.

Pursuant to another embodiment of the present invention there is provided a user device for providing of metering information, comprising first receiving means for receiving from a metering server key information and encrypted instruction data via a communication network, displaying means for displaying user information responsive to the receiving from the metering server, establishing means for establishing a communication link with a metering equipment, providing means for providing the received key information and the received encrypted instruction data via the established communication link responsive to the establishing, second receiving means for receiving from the metering equipment via the established communication link the metering information responsive to the providing, wherein the metering information comprises reply key information and encrypted execution information, sending means for sending the reply key information and the encrypted execution information via the communication network to the metering server responsive to availability of communication to the metering server. Thus the user device on the one hand advantageously supports the providing the metering information according to the aspects of security and privacy by providing key information and encrypted instruction data, by sending the reply key information and encrypted execution information. On the other hand the user device supports at the same time advantageously a low energy consumption in the metering equipment by providing the communication interface to the metering server and by providing the metering information, i.e., the reply key information and the encrypted execution information responsive to availability of communication to the metering server. Thus high energy consumption due to wide area communication methods over the communication network is not needed in the metering equipment. Also all fault handling for the case of repeated communication attempts and supervision of availability of communication with the metering server need not be implemented in the metering equipment. As well manufacturing cost of the metering equipment are reduced, due to the fact that the metering equipment may have an inexpensive low performance battery and does not require a complex wide area communication interface HW, but may use a low cost Bluetooth transceiver as communication interface HW.

Pursuant to a further embodiment the user device is adapted to interface the communication network via at least one of a 2G connection, a 3G connection, a 4G connection, a WAN connection, a WiFi connection, a WLAN connection, a DSL connection, a cable connection, a fiber optic connection. Thus advantageously the existing or available interface HW and SW of the user device may be used for providing the metering information, the customer or user, already uses, e.g., for his/her usual access to the Internet.

Pursuant to another embodiment the user device further comprises at least one of requesting means for requesting from the metering server key information and encrypted instruction data via the communication network, first storing means for storing locally the received key information and the received encrypted instruction data, second storing means for storing locally the received reply key information and/or the received encrypted execution information, further displaying means for displaying further user information responsive to the receiving from the metering equipment, resuming means for resuming of the communication via the communication network, if said communication is interrupted.

Pursuant to another embodiment the user device further comprises downloading means for downloading from the metering server to the user device a software component for the providing of the metering information.

According to another embodiment of the present invention there is provided a system for providing of metering information, comprising the metering equipment and the user device.

According to another embodiment the system further comprises the metering server.

DESCRIPTION OF THE INVENTION

The making and using of presently preferred embodiments are discussed in detail below. It should be appreciated, however, that the present invention provides many applicable inventive concepts that can be embodied in a wide variety of specific contexts. The specific embodiments discussed are merely illustrative of specific way to make and use the invention, and do not limit the scope of the invention. Moreover, same reference signs refer to same technical features, if not stated otherwise. As far as "may" is used in this application, it means the possibility of doing so as well as the actual technical implementation.

Figure 1:
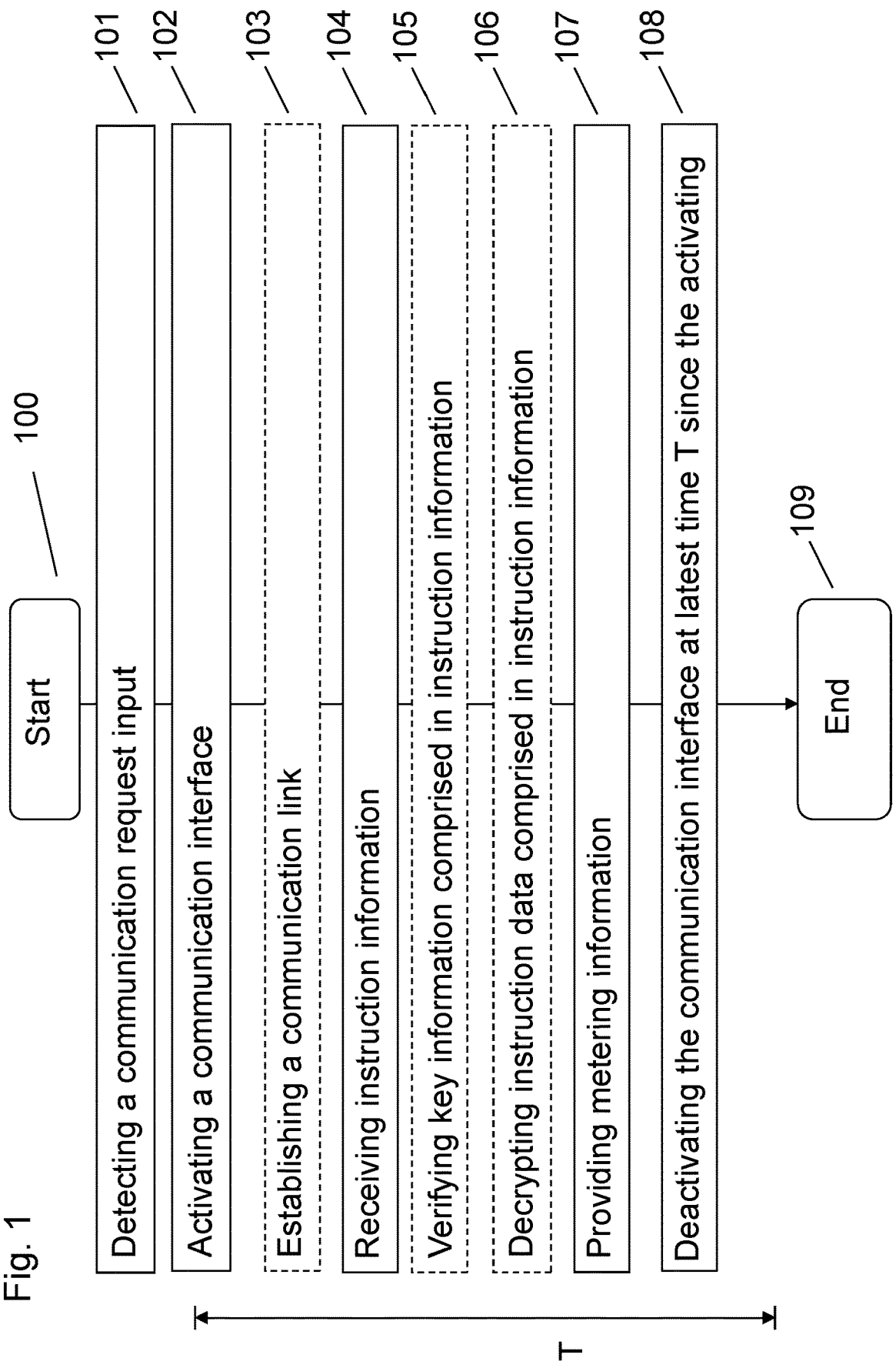
FIG. 1 presents a flow diagram showing method steps of a method for providing of metering information of a metering equipment.

FIG. 1 presents a flow diagram showing method steps of a method for providing of metering information of a metering equipment. After a start (step 100) a communication request input is detected at the metering equipment in a step 101. The detected communication request input may be due to a manual activation of a switch at or connected to the metering equipment. More generally it may as well be due to a signal received at the metering equipment. Such signal may for instance be related to timing equipment, a sensor equipment and/or a receiver equipment. In particular, a movement sensor may provide the signal, when detecting a moving subject in its field of view. As well a timer clock may provide the signal. For instance the timer clock may provide the signal at a time at the end of a year or at another time before the providing the metering information is due. This enables in particular the annual providing the metering information during the time period T. As well a switch including the signal generating entity may be comprised in the metering equipment. Responsive to the detecting the communication request input a communication interface of the metering equipment is activated in a step 102. For utilization of the communication interface for the providing of the metering information it may be necessary to establish in an optional step 103 a communication link via the communication interface. Then the metering equipment is in a state of being ready to receive instruction information via the activated communication interface. The instruction information may comprise key information in particular allowing to filter out non-authorized accesses to the metering equipment and/or may comprise instruction data, which may be encrypted. The instruction information may specify which metering data are to be provided by the metering equipment. In a step 104 the instruction information is received via the communication interface in the metering equipment. In an optional step 105 the key information, if present, may be verified responsive to receiving the instruction information in the metering equipment. In case the key information, e.g., on base of information stored in the metering equipment, cannot be verified, the metering equipment may not further process the received instruction information. In this case of a not authorized access an appropriate fault indication may be provided via the communication interface. As well an immediate or delayed deactivation of the communication interface may be performed, which is responsive to detecting, that the key information cannot be verified. In case the instruction information comprises encrypted instruction data, the encrypted instruction data may be decrypted in an optional step 106 responsive to the receiving the instruction information. The step 106 may preferably not be executed, if the verifying according to the optional step 105 has been unsuccessfully performed. With availability of the decrypted or non-encrypted instruction information in the metering equipment the metering information can be generated by the metering equipment. According to the instruction information requested metering data may be red out of a memory of the metering equipment or may be caught from dependent meters or storage equipment outside the metering equipment. The metering data and/or processing related execution information may form the metering information. In a step 107 the metering information is provided via the activated communication interface responsive to the received instruction information. Regardless to the duration and progress of the steps described above, the communication interface is deactivated in a step 108 at latest after a time period T since the activation. The time period T may have a fixed, preconfigured or in operation configurable duration, which under normal operation conditions is sufficient to provide the metering information according to the instruction information on base of the resources of the metering equipment. The method ends with step 109.

Figure 2:
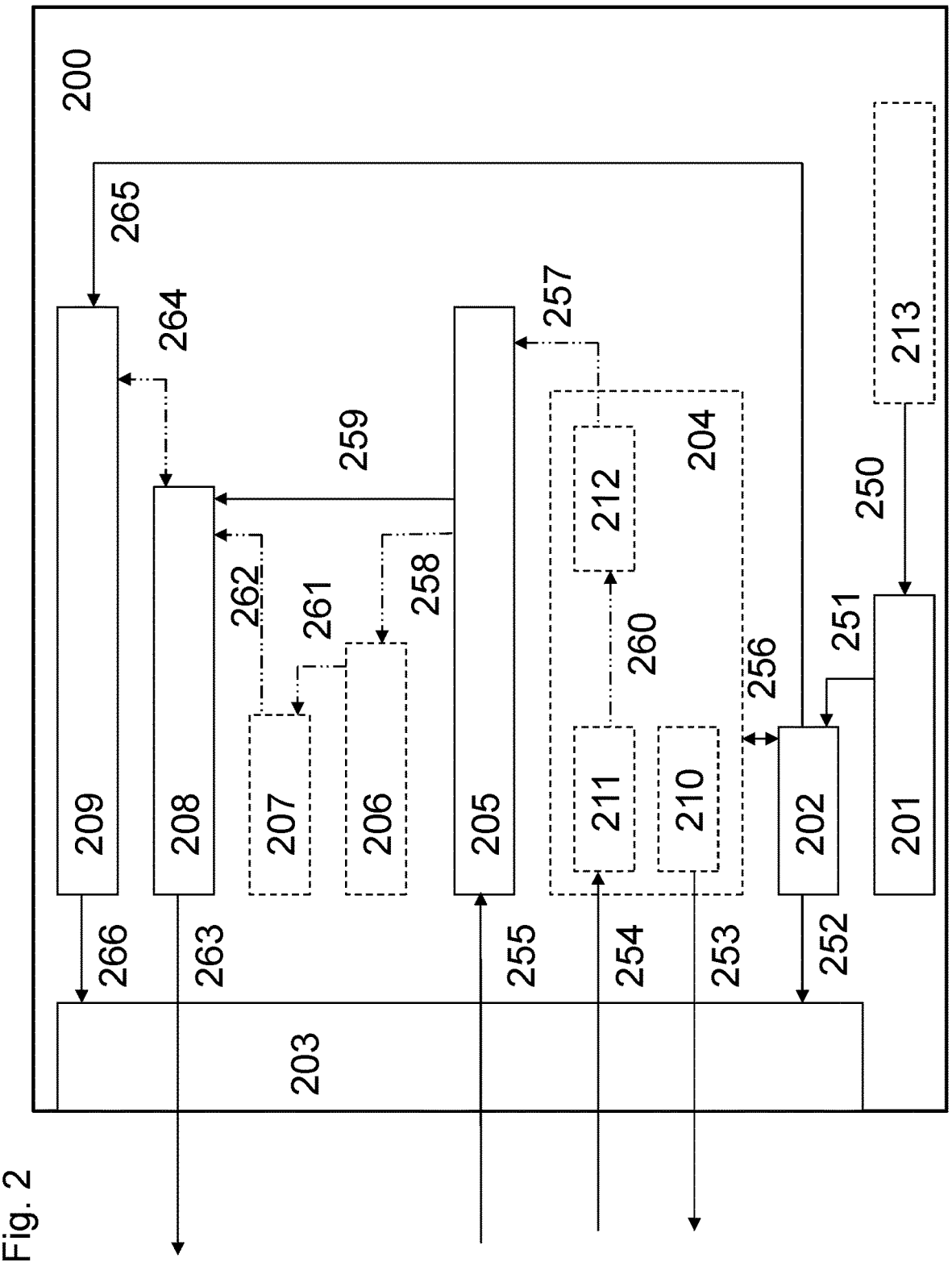
FIG. 2 presents a simplified block diagram of an embodiment for illustration of an information flow assigned to a metering equipment for providing of metering information.

FIG. 2 presents a simplified block diagram of an embodiment for illustration of an information flow assigned to a metering equipment 200 for providing of metering information. The metering equipment 200 comprises detecting means for detecting a communication request input 250. The metering equipment 200 may optionally comprise input means 213, for instance a switch, that provides the communication request input 250, e.g., due to a switching of the switch. The detection means 201 may inform activating means 202 of the metering equipment 200 via a communication relationship 251 in response to the detected communication request input 250. The activating means 202 responsive to being informed via the communication relationship 251 may activate a communication interface 203 of the metering equipment 200 via a communication relationship 252. At the same time it may inform deactivating means 209 of the metering equipment 200 via a communication relationship 265 on the fact, that the communication interface 203 has been activated.

Optionally the metering equipment 200 may comprise establishing means 204 for establishing a communication link via the activated communication interface 203. In case of presence of the establishing means 204, the activation means 202 may inform the establishing means 204 via a communication relationship 256 on the fact, that the communication interface 203 has been activated. Responsive to the communication relationship 256 the establishing means 204 establishes the communication link. For this purpose the establishing means may comprise sending means 210, obtaining means 211 and authenticating means 212. For establishing the communication link responsive to the communication relationship 256 the sending means 210 may send a communication request 253 via the communication interface 203. In the course of an successful establishing of the link, the obtaining 211 may obtain credentials 254 via the communication interface 203 in response to the sending the communication request 253. Responsive to obtaining the credentials the obtaining means 211 may forward the obtained credentials via a communication relationship 260 to an authentication means 212 for authenticating the forwarded obtained credentials. In case of a successful authenticating the authenticating means 212 may inform a receiving means 205 comprised in the metering equipment 200 via a communication relationship 257 on the fact, that the communication link has successfully been established. The communication relationship 257 may provide to the receiving means 205 link parameters and/or link specific data, in order to support and/or enable the receiving means 205 to receive instruction information via the established link over the activated communication interface 203. In case the communication link cannot be established for instance due to not obtaining the credentials or to unsuccessful authenticating of the obtained credentials, the establishing means may inform the activating means 202 accordingly via the communication relationship 256. Thus the activating means may initiate appropriate fault handling activities, such as for instance reset or power down of the communication interface 203, start of fault diagnosis of the communication interface 203 and appropriate fault reporting, e.g., via visible signal at the metering equipment, indicating lost communication capability.

After activating the communication interface 203 the receiving means 205 may receive the instruction information 255 via the activated communication interface. If before the establishing of the communication link has been performed, the receiving means 205 is enabled due to the communication relationship 257 to expect the receiving of the instruction information 255 via the established communication link. The receiving means 205 may forward the received instruction information 255 via a communication relationship 259 to a providing means 208 comprised in the metering equipment 200. If the instruction information comprises key information and encrypted instruction data, the receiving means 205 may optionally forward the received instruction information 255 to a verifying means 206 via a communication relationship 258. The verifying means 206 is an optional component of the metering equipment 200. In case of a successful verifying the key information the verifying means 206 may via a communication relationship 261 inform a decrypting means on the received instruction information, in particular the encrypted instruction data. The decrypting means 207 is a further optional component of the metering equipment 200. After successful decrypting the encrypted instruction data the decrypting means may forward the decrypted instruction data and optionally the key information to the providing means 208 via the communication relationship 262. Unsuccessful verifying or unsuccessful decrypting may be forwarded as well via the communication relationships 261 and 262 to the providing means 208. In the case of an unsuccessful verifying the decrypting means 207 may be adapted to not decrypt the instruction data, in order to save energy in the metering equipment 200.

The providing means 208 may receive the instruction information via the communication relationship 259 or may optionally receive at least the decrypted instruction data via the communication relationship 262. Thus generating of the metering information responsive to the received instruction information is enabled, if plausible instruction information or a plausible decrypted instruction data is received via the communication relationships 259 and 262 respectively. In this case the providing means 208 provides the metering information via the communication relationship 263 over the activated communication interface 203. In case the metering information cannot be generated, e.g., due to implausible instruction information, decrypting fault, verifying fault, or other problems, the providing means 208 may provide appropriate failure information via the communication relationship 263. The failure information may as well comprise a tampering information. After providing the metering information or after providing the appropriate fault information, the providing means 208 may optionally inform the deactivating means 209 via the communication relationship 262 to deactivate the communication interface 203.

The deactivating means 209 may be informed on the activating the communication interface 203. This may have been done via the communication relationship 265. When being informed, that the communication interface 203 is activated, the deactivating means 209 may start a timer element with length of the time period T. With expiration of the timer element the deactivating means 209 may deactivate the communication interface 203 via the communication relationship 266. In order to save further energy, the deactivating means 209 may inform the providing means 208 via the communication relationship 264 to stop processing, as the communication interface 203 has been deactivated. In the optional case, in which the deactivating means 209 is informed via communication relationship 264, that the providing has already been performed, the deactivating means 209 may immediately deactivate the communication interface 203 and stop the timer element. Thus advantageously further energy is saved in the metering equipment 200.

The mentioned communication relationships of FIG. 2 may be bus, message, and/or signal based, preferably, but not necessarily allowing a message based communication between the structural elements of the metering equipment 200. Broken lines and broken lined arrows indicate optional structural elements or optional communication relationships respectively.

Figure 3:
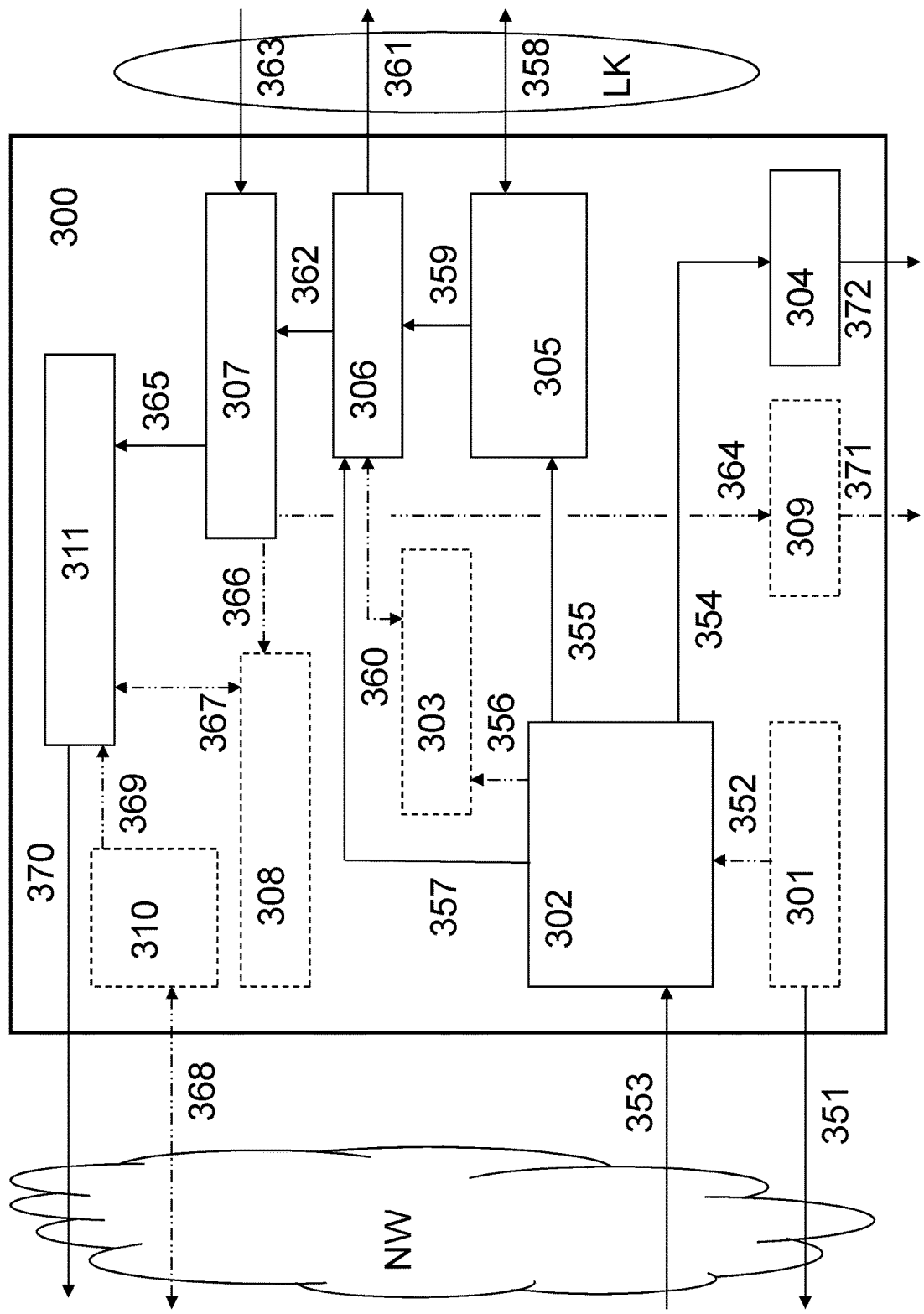
FIG. 3 presents a simplified block diagram of an embodiment for illustration of an information flow assigned to a user device for providing of metering information.

FIG. 3 presents a simplified block diagram of an embodiment for illustration of an information flow assigned to a user device 300 for providing of metering information. The user device 300 may comprise first receiving means 302, displaying means 304, establishing means 305, providing means 306, second receiving means 307, and sending means 311. As optional elements the user device may further comprise requesting means 301, first storing means 303, second storing means 308, further displaying means 309, and resuming means 310.

The first receiving means 302 may receive via a communication network NW key information and encrypted instruction data via the communication relationship 353. The key information and the encrypted instruction data may for instance be received from a metering server. The metering server may be operated by a metering or utility company.

Triggered, e.g., by appropriate user activity, the requesting means 301 may have requested from the metering server the key information and the encrypted instruction data via the communication network NW. Said request may be represented by a communication relationship 351. The requesting means 301 may inform the first receiving means 302 accordingly via a communication relationship 352. Thus the first receiving means 302 may be enabled to process only key information and encrypted instruction data, if they are received responsive to the request.

The first receiving means 302 informs via the communication relationship 354 the displaying means 304 for displaying user information responsive to the receiving. The displaying means 304 provides the user information 372 to the user of the user device. The user information may comprise progress information on the process of providing the metering information. Further the user information may comprise instruction information, e.g., to move the user device into the vicinity of a metering equipment the metering information origins from. The displaying means 304 may be an integrated screen of the user device 300 or a screen connected to the user device, e.g., a screen of a personal computer, in particular a laptop, or a mobile phone or a window on such screens. The first receiving means 302 may further inform the establishing means 305 via a communication relationship 355 to establish a communication link LK with said metering equipment. Further the first receiving means 302 may provide the received key information and the received encrypted instruction data to the providing means 306 via a communication relationship 357 without or on request of the providing means 306. Alternatively or optionally the first receiving means 302 may store the received key information and the received encrypted instruction data in the first storing means 303 via a communication relationship 356.

The establishing means 305 may for instance rely on a permanently activated appropriate communication interface of the user device for communication to the metering equipment, e.g., a short distance radio interface. Successful exchange of credentials 358 with the metering equipment via the permanently activated appropriate communication interface of the user device may establish the communication link LK. Once the communication link LK is established, the providing means 306 may be informed by the establishing means 305 via the communication relationship 359. The communication relationship 359 may comprise access information related to the communication link LK. In response the providing means 306 provides the received key information and the received encrypted instruction data via the established communication link LK, which is represented as a communication relationship 361. The providing means may receive the key information and the encrypted instruction data by usage of the communication relationship 357 or a communication relationship 360. The communication relationship 360 may allow the providing means 306 to read the key information and the encrypted instruction data from the first storing means 303. The second receiving means 307 may be informed on the providing by the providing means 306 via the communication relationship 362. The communication relationship 362 may comprise access information related to the communication link LK.

The second receiving means 307 receives from the metering equipment the metering information via the communication relationship 363 over the established link LK and may provide the received metering information to the sending means 311 via a communication relationship 365. Alternatively the communication relationship 365 may comprise an indication, that the metering information is available for sending by the sending means 311. The second receiving means 307 may optionally provide the received metering information via the communication relationship 366 to the second storing means 308, from where it may be provided via the communication relationship 367 to the sending means 311. The second receiving means 307 may optionally inform via the communication relationship 364 the further displaying means 309 for displaying further user information responsive to the receiving. The further displaying means 309 may provide the further user information 371 to the user of the user device.

The further user information may optionally also comprise progress information on the process of providing the metering information. The further user information may comprise further instruction information, e.g., to move the user device back to its previous location and/or to reconnect the user device to the network NW. The further displaying means may be an integrated or connected screen of the user device, e.g., a screen of a personal computer or a mobile phone or a window on such screens. The sending means 311 may send a reply key information and an encrypted execution information, both comprised in the received metering information via a communication relationship 370 over the communication network NW to the metering server. The sending may be dependent and/or responsive to availability of communication to the metering server. In case of uninterrupted access to the metering server the sending may be executed immediately after availability of the metering information in the user device. In particular in case of disconnection of the user device from the network NW or disturbance or breakdown of communication between the communication network NW and the user device resuming means 310 for resuming communication via the communication network may recover communication availability via communication relationship 368 and inform the sending means 311, if communication via the communication network NW is available again. The resuming means 310 may inform the sending means 311 via the communication relationship 369. The communication relationship 369 may trigger the sending of the reply key information and the encrypted execution information by the sending means 311.

The mentioned communication relationships of FIG. 3 may be bus, message, and/or signal based, preferably, but not necessarily allowing a message based communication between the structural elements of the user device 300. Broken lines and broken lined arrows indicate optional structural elements or optional communication relationships respectively.

Figure 4:
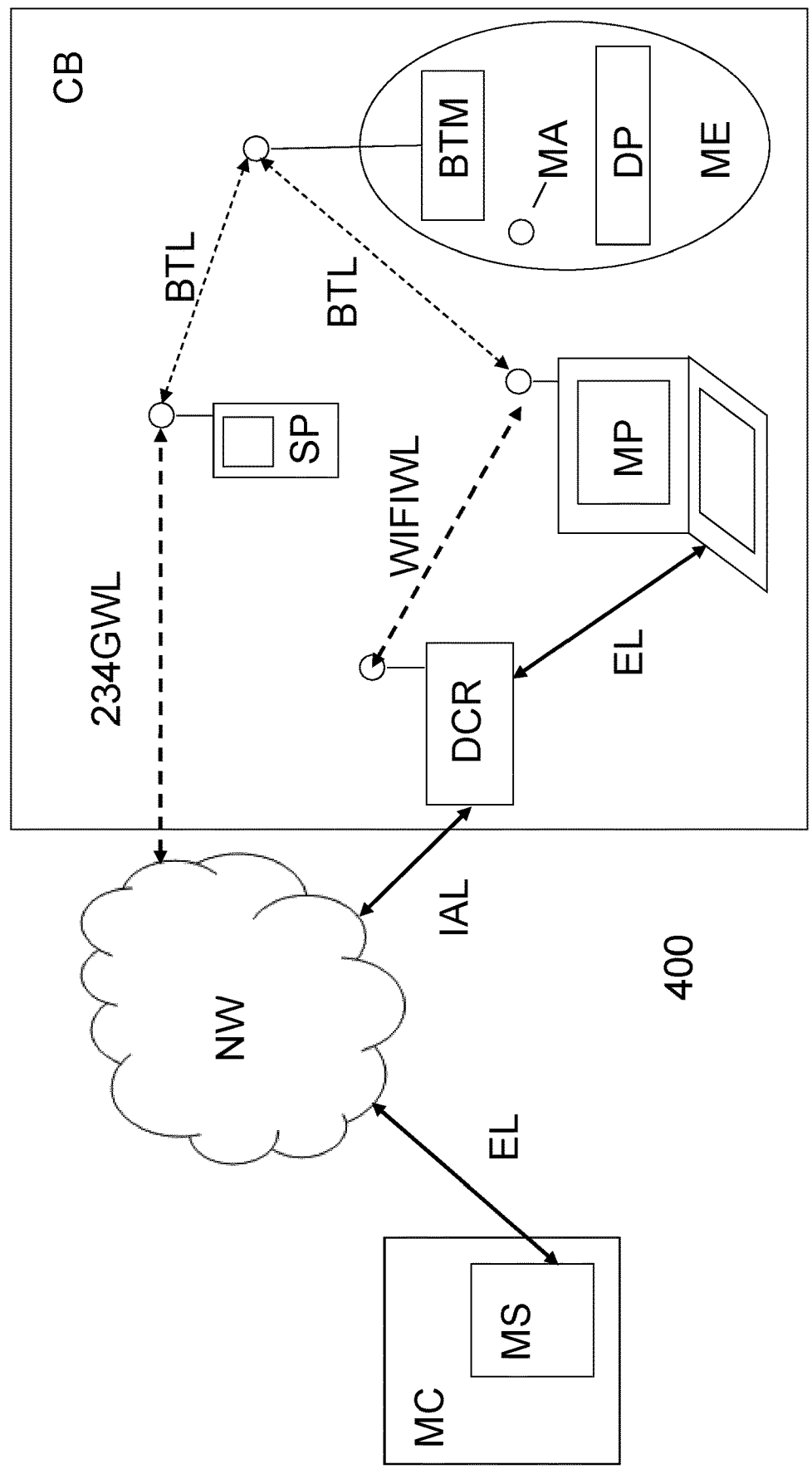
FIG. 4 presents a simplified block diagram of an embodiment for illustration of a system for providing of metering information.

FIG. 4 presents a simplified block diagram of an embodiment for illustration of a system 400 for providing of metering information. A communication network NW connects a metering company MC and a user device located in a customer building CB. The communication network NW may for instance be the Internet or a wide area network. A metering server MS of the metering company MC may for instance be connected to the communication network NW via an Ethernet link EL. The user device may be a smart phone SP, which is connected via a radio based link 234GWL to the communication network NW. The radio based link 234GWL may provide mobile communication according to 2G, 3G, 4G, or other WAN standards. Alternatively the user device may be a mobile processor MP, e.g., a laptop. The mobile processor MP may be connected via an Ethernet Link EL or via a wireless link WIFIWL to a DSL based or cable based router DCR, which may be connected to the communication network NW via an Internet access link IAL. The wireless link WIFIWL may be based on WiFi or WLAN technology. The smart phone SP and the mobile processor MP may be equipped with a Bluetooth interface, enabling establishment of a Bluetooth Link BTL to a metering equipment ME. The metering equipment ME may comprise a Bluetooth interface module BTM for communication with the user device, a switch MA for temporary activation of the Bluetooth Link BTL and a display DP for providing current metering and/or status information, e.g., the current cumulated cold water consumption.

As a prerequisite for providing metering information of the metering equipment ME a metering equipment related communication applet, e.g., a Java applet provided by the metering company MC, may be loaded on the smart phone SP or the mobile processor MP. The communication applet may be initiated by the customer. The communication applet may build a WAN connection via a local internet connection, in particular via the radio based link 234GWL or via the wireless link WIFIWL to the metering server MS and obtain from the metering server MS and store locally a token or secure key and some ancillary encrypted information, in particular instruction data for a current transaction, e.g., the providing the metering information. The smart phone SP or laptop MP may now be carried into the reception range of the metering equipment ME, regardless if there is a WAN connection present or not. A lack of WAN connectivity may, e.g., be due to a shielded basement location of the metering equipment ME. The metering equipment may incorporate a manually controllable switch or push button or similar input means to initiate a singular communication request via the Bluetooth link BTL to the smart phone SP or laptop MP. Then the smart phone SP or the laptop MP may provide the previously obtained token and ancillary information to the metering equipment ME. The metering equipment may now verify the token, decrypts the ancillary information and responds with an encrypted message containing the answer to the key challenge in form of a reply token as well as for instance a specific metering read-out-request answer, as requested in the ancillary information. The reply token as well as the specific metering read-out-request answer are now either stored in the smart phone SP or laptop MP in case of not available WAN connection or directly forwarded unchanged to the metering server MS in case of available WAN connection.

In case of not available WAN connection the consumer may reconnect to the WAN whereupon the stored information may automatically be sent by the user device to the metering server MS. Upon decryption and validation of the metering information the metering server MS may send an acknowledgement to the applet to delete the stored previously received information from the WAN and LAN links and display a successful information exchange to the consumer. The Java software applet for the smart phone SP may for instance be compatible with Android, Apple IOS, Symbian, dependent on the smart phone SP. The Java software applet for or laptop MP may for instance run on Windows, Linux, Mac, etc. Advantageously Bluetooth transceivers are low priced parts in the metering equipment ME. The applied encryption technology may be based on secure key exchange industry standard. No persistent Internet connection of the smart phone SP or laptop MP is required for providing the metering information, thus enabling meter installations in difficult to reach locations. By implementing a temporary activated communication interface in the metering equipment lifetime battery operation and consumer controlled providing of the metering information are achieved. An optional manually assisted workflow may look as follows: The metering company MC may send an email to the customer asking for cooperation. In response the customer may log into his personal web page, which may be Java or HTML5 based and which may be hosted by the metering company, using his known credentials. A request may show up to support providing of metering information from the metering equipment. A link may need to be clicked, whereupon a web page with embedded Java applet may open. The following process may be explained to the customer in text and graphics. The customer may be asked to click on a download button, handled within the webpage and/or supported by Java, to download instruction information to be transferred to the metering equipment ME. After the download the web page may show readiness for transfer and may ask the customer to go to the metering equipment ME and to press a button on the meter. The metering equipment ME may in response turn on its Bluetooth interface BTM and try to connect to the laptop MP or smart phone SP. The user device may ask for the Bluetooth PIN, which may be shown on the web page and which may optionally be the same PIN all the time or may be changed from time to time. The customer may enter the Bluetooth PIN and via the established Bluetooth connection the data previously stored by the web page may be loaded into the metering equipment ME. The web page may tell the customer to wait for acknowledgement from the metering equipment for a while or may give indication what to do, if something may not work as expected. The metering equipment ME may authenticate the origin of the data with its own key, known only to the metering company MC, may decrypt and execute the instruction data from the instruction information. The metering equipment ME may respond with an encrypted message to the user device. The user device's web page may show the acknowledgement from the metering equipment ME, that metering information has been transferred and stored. The web page now may indicate to reestablish the Internet connection in case it has been interrupted. When the user device is connected to the Internet again, the web page may ask the customer to finalize the metering information transfer by a click. Responsive the metering information may be transferred from the user device to the metering server MS. Acknowledgement from the metering company MC may be shown on the web page for a successful metering information transfer process on behalf of the metering company MC. The customer may be asked to close the metering information transfer related web page. The web page may now indicate to the customer that new consumption data will become available in his personal Energy Company web area. Metering and utility companies may work hand in hand in the above process. This leaves also the option who may operate the above process. In the described case, the metering company MC is the host. The final acknowledgement, that the metering information transfer has been successful, may generally come from the metering company MC, since they are the only ones who may know about the meter key, in particular the key information.

ABBREVIATIONS 2G second generation mobile networks, in particular GSM and EDGE
3G third generation mobile networks, in particular UMTS
3GPP 3rd Generation Partnership Project
4G fourth generation mobile networks, in particular LTE
ATM Asynchronous Transfer Mode
DSL Digital Subscriber Line
EDGE Enhanced data Rates for GSM Evolution
FW Firmware
GSM Global System for Mobile Communications
HTML5 Hypertext Markup Language, $5^{th}$ revision
HW Hardware
ISDN Integrated Digital Services Network
IP Internet Protocol
Java A programming language
Laptop Portable Computer
LAN Local Area Network
LTE Long Term Evolution
M2M Machine to Machine
PC Personal Computer
PSTN Public Switched Telephone Network
SW Software
UMTS Universal Mobile Telecommunications System
WAN Wide Area Network
Wi-Fi Trademark of Wi-Fi Alliance (Wi-Fi enabled device with access via wireless access network/hotspot)
WLAN Wireless Local Area Network

The invention claimed is:

1. A method for providing metering information of metering equipment, which comprises the steps of:
   detecting a communication request input at the metering equipment, the communication request input being provided by a manually operable switching device, a switch, or a push button of the metering equipment;
   activating a communication interface of the metering equipment responsive to the communication request input detected;
   establishing a communication link via the activated communication interface;
   wherein after establishing the communication link the metering equipment enters a status, in which it is ready for receiving instruction information via the activated communication interface and the established communication link;
providing via the activated communication interface the metering information responsive to the instruction information received; and
deactivating the activated communication interface at a latest after a time period since the activating step is performed, the time period being sufficient to complete said receiving and said providing under normal operating conditions, the time period configurable to allow for instance adaptation to performance and quality of communication via the communication interface.

2. The method according to claim 1, wherein the instruction information includes key information, and the method further comprises the steps of: verifying the key information responsive to receiving the instruction information; and providing the metering information responsive to the key information that is verified.

3. The method according to claim 2, wherein: the key information includes a token and/or the metering information includes a reply token.

4. The method according to claim 2, wherein the instruction information includes encrypted instruction data, and the method further comprises the steps of: decrypting the instruction information responsive to receiving the instruction information; and providing the metering information responsive to the decrypted instruction data.

5. The method according to claim 4, wherein the decrypting step is responsive to the verifying step.

6. The method according to claim 1, wherein the communication interface includes a short distance radio interface being a low power local area network Bluetooth interface.

7. The method according to claim 1, wherein the establishing step further comprises:
sending a communication request via the communication interface;
obtaining credentials via the communication interface in response to the sending step; and
authenticating the credentials obtained.

8. The method according to claim 7, wherein the credentials include a PIN.

9. The method according to claim 1, wherein the receiving is responsive to the establishing.

10. The method according to claim 1, wherein the time period is configurable to be adapted to the of the metering equipment based on one or more parameters, the one or more parameters comprising at least one of a processing capacity consumption of the metering equipment, a communication performance consumption of the metering equipment, a memory consumption of the metering equipment, or one Or more protocols for the metering equipment, wherein the one or more protocols are used for providing the metering information, a maximum number of retrials in case of unsuccessful receiving, a maximum number of retrials in case of unsuccessful providing, or combinations thereof.

11. The method according to claim 1, wherein the instruction information includes at least one of a read request for metering data stored in the metering equipment, tariff information for storage in the metering equipment, and upgrade information for firmware upgrade of the metering equipment.

12. The method according to claim 1, wherein the metering information includes execution information.

13. The method according to claim 12, wherein the execution information includes at least one of metering data stored in the metering equipment, an execution acknowledgement, fault data, status data, configuration data and tampering information.

14. The method according to claim 12, which further comprises encrypting the execution information, wherein the metering information includes encrypted execution information.

15. The method according to claim 1, wherein the deactivating step is responsive to the providing step.

16. The method according to claim 1, further comprising:
receiving in a user device from a metering server the instruction information via a communication network;
displaying user information responsive to receiving the instruction information;
establishing by the user device, a communication link between the user device and tike metering equipment;
providing by the user device via an established communication liar the instruction information received in the user device;
receiving in the user device via the established communication link the metering information responsive to providing the instruction information received in the user device; and
sending by the user device the metering information received via the communication network.

17. The method according to claim 16, wherein for receiving the instruction information in the user device and/or for sending the metering information received by the user device there is used at least one of:
a 2G connection;
a 3G connection;
a 4G connection;
a WAN connection;
a WiFi connection;
a WLAN connection;
DSL connection;
a cable connection; and
a fiber optic based connection.

18. The method according to claim 16, further comprising performing at least one of:
requesting from the metering server by the user device the instruction information via the communication network;
storing locally the instruction information received;
storing locally the metering information received;
displaying further user information responsive to receiving the metering information;
resuming communication via the communication network, if the communication is interrupted.

19. The method according to claim 16, further comprising downloading from the metering server to the user device a software component for providing of the metering information.

20. The method according to claim 19, wherein the software component is executable in the user device.

21. The method according to claim 19, wherein the software component is a Java applet embedded in a web page or is provided via HTML5.

22. Metering equipment for providing metering information, comprising:
a detecting device for detecting a communication request input at the metering equipment;
an input device for providing a communication request input, said input device selected from the group consisting of a manually operable switching device, a switch, and
a push button;

a communication interface;
an activating, device for activating said communication interface responsive to a detected communication request input;
an establishing device for establishing a communication link via said communication interface;
an input receiving device for receiving instruction information via said communication interface and said communication link, wherein after establishing the communication link the metering equipment enters a status, in which it is ready for receiving the instruction information via the activated communication interface and the established communication link;
a providing device for providing via said communication interface the metering information responsive to received instruction information; and
a deactivating device for deactivating said communication interface at a latest after a time period since the activating of said communication interface, the time period being sufficient to complete said receiving and said providing under normal operating conditions, the time period configurable to allow for instance adaptation to performance and quality of communication via the communication interface.

23. The metering equipment according to claim 22, wherein the received instruction information includes key information; and
further comprising a verifying device for verifying the key information responsive to the received instruction information; and
wherein said providing device is adapted to providing the metering information responsive to verified key information.

24. The metering equipment according, to claim 23, wherein:
the key information includes a token; and/or
the metering information includes a reply token.

25. The metering equipment according to claim 22,
wherein the received instruction information includes instruction data; further comprising a decrypting device for decrypting the received instruction data responsive to receiving the instruction information; and
wherein said providing device is adapted to providing the metering information responsive to decrypted instruction data.

26. The metering equipment according to claim 25, wherein said decrypting device is adapted to decrypting the instruction data responsive to the verifying the key information.

27. The metering equipment according to claim 22, wherein said communication interface includes a short distance radio interface being a low power local area network Bluetooth interface.

28. The metering equipment according to claim 22, wherein said establishing device has:
a sending device for sending a communication request via, said communication interface; an obtaining device for obtaining credentials via said communication interface in response to said sending; and
an authenticating device for authenticating obtained credentials.

29. The metering equipment according to claim 28, wherein the obtained credentials include a PIN.

30. The metering equipment according to claim 22, wherein said input receiving device is adapted to receive the instruction information responsive to an establishing of the communication link.

31. The metering equipment according to claim 22, wherein the time period is configurable to be adapted to the of the metering equipment based on one or more parameters, the one or more parameters comprising at least one of processing capacity consumption of the metering equipment, a communication performance consumption of the metering equipment, a memory consumption of the metering equipment, or one or more protocols for the metering equipment, wherein the one or more protocols are used for providing the metering information, maximum number of retrials in case of unsuccessful receiving, a maximum number of retrials in ease of unsuccessful providing, or combinations thereof.

32. The metering equipment according to claim 22, wherein the instruction information includes at least one of:
a read request for metering data stored in the metering equipment;
tariff information for storage in the metering equipment; and
upgrade information for Firmware upgrade of the metering equipment.

33. The metering equipment according to claim 22, wherein the metering information includes execution information.

34. The metering equipment according to claim 33, wherein the execution information includes at least one of:
metering data stored in the metering equipment;
an execution acknowledgement;
fault data;
status data;
configuration data; and
tampering information.

35. The metering equipment according to claim 33, further comprising an encrypting device for encrypting the execution information, wherein the metering information includes encrypted execution information.

36. The metering equipment according to claim 22, wherein said deactivating device is adapted to deactivating said communication interface responsive to the providing of the metering information.

37. A system for providing metering information, comprising:
metering equipment, including:
a detecting device for detecting a communication request input at said metering equipment;
an input device, selected from the group consisting of a manually operable switching device, a switch and a push button, for providing a communication request input;
a communication interface;
an activating device for activating said communication interface responsive to a detected communication request input;
an establishing device for establishing a communication link via said communication interface;
an input receiving device for receiving instruction information via said communication interface and said communication link, wherein after establishing the communication link the metering equipment enters a status, in which it is ready for receiving the instruction information via the activated communication interface and the established communication link;
a providing device for providing via said communication interface the metering information responsive to received instruction information; and a deactivating device for deactivating said communication interface at a latest after a time period since the activating of said communication interface, the time period being sufficient to complete said receiving and said providing under normal operating conditions, the time period configurable to allow for instance adaptation to performance and quality of communication via the communication interface; and a user device including:
- a first receiving device for receiving key information from a metering server and encrypted instruction data via a communication network;
- a displaying device for displaying user information responsive to the key information from the metering server;
- an establishing device for establishing a communication link with said metering equipment;
- a providing device for providing the key information and the encrypted instruction data via the communication link;
- a second receiving device for receiving from said metering equipment via the communication link the metering information, wherein the metering information includes reply key information and encrypted execution information; and
- a sending device for sending the reply key information and the encrypted execution information via the communication network to the metering server responsive to availability of communication to the metering server.

38. The system according to claim 37, wherein the user device is adapted to interface the communication network via at least one of:
- a 2G connection;
- a 3G connection;
- a 4G connection;
- a WAN connection;
- a WiFi connection;
- a WLAN connection;
- a DSL connection;
- a cable connection; and
- a fiber optic based connection.

39. The system according to claim 37, the user device further comprising at least one of:
- a requesting device for requesting the key information from the metering server and the encrypted instruction data via the communication network (NW);
- a first storing device for storing locally the key information and the encrypted instruction data;
- a second storing device for store locally the reply key information and/or the encrypted execution information;
- a further displaying device for displaying further user information; and
- a resuming device for resuming of the communication via the communication network, if the communication is interrupted.

40. The system according to claim 37, the user device further comprising a downloading device for downloading from the metering server to the user device a software component for assisting in providing the metering information.

41. The system according to claim 40, wherein the software component is executable in the user device.

42. The system according to claim 40, wherein the software component is a Java applet embedded in a web page or is provided via HTML5.

43. The system according to claim 37, wherein the user device is selected from the group consisting of a phone, a mobile phone, a smart phone, a PC, a laptop, a tablet customer device and a mobile processing unit.

44. The system according to claim 37, further comprising said metering server.

* * * * *